US010634404B2

(12) United States Patent
Obara et al.

(10) Patent No.: US 10,634,404 B2
(45) Date of Patent: Apr. 28, 2020

(54) AIR-CONDITIONING APPARATUS

(71) Applicant: Mitsubishi Electric Corporation, Tokyo (JP)

(72) Inventors: Koichi Obara, Tokyo (JP); Masahiko Takagi, Tokyo (JP); Yasuhiro Suzuki, Tokyo (JP); Kenyu Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 15/768,264

(22) PCT Filed: Dec. 21, 2016

(86) PCT No.: PCT/JP2016/088168
§ 371 (c)(1),
(2) Date: Apr. 13, 2018

(87) PCT Pub. No.: WO2017/110904
PCT Pub. Date: Jun. 29, 2017

(65) Prior Publication Data
US 2018/0313591 A1 Nov. 1, 2018

(30) Foreign Application Priority Data
Dec. 22, 2015 (WO) .................. PCT/JP2015/085787

(51) Int. Cl.
*F25B 49/02* (2006.01)
*G01N 27/04* (2006.01)
(Continued)

(52) U.S. Cl.
CPC .............. *F25B 49/02* (2013.01); *F24F 11/89* (2018.01); *F24F 13/20* (2013.01); *G01N 27/04* (2013.01);
(Continued)

(58) Field of Classification Search
CPC .......... F24F 1/0043; F24F 11/89; F24F 13/20; F24F 13/222; G01N 27/04; F25B 2400/12;
(Continued)

(56) References Cited

U.S. PATENT DOCUMENTS

2017/0314805 A1* 11/2017 Ikawa ...................... F24F 11/89

FOREIGN PATENT DOCUMENTS

| CN | 204787071 U | 11/2015 | |
|---|---|---|---|
| JP | 63-27859 U * | 2/1988 | ............. G01N 27/00 |

(Continued)

OTHER PUBLICATIONS

International Search Report of the International Searching Authority dated Feb. 28, 2017 for the corresponding international application No. PCT/JP2016/088168 (and English translation).

(Continued)

*Primary Examiner* — Edward F Landrum
*Assistant Examiner* — Chang H Park
(74) *Attorney, Agent, or Firm* — Posz Law Group, PLC

(57) ABSTRACT

An indoor unit of an air-conditioning apparatus includes: a casing; a drain pan, which is provided inside the casing, and is configured to receive condensate water generated in the load-side heat exchanger; and a refrigerant detection unit provided below the drain pan inside the casing. The refrigerant detection unit includes: a sensor configured to detect leakage of the refrigerant; and a sensor cover configured to cover the sensor from a front surface side of the sensor. The sensor cover includes: a roof portion arranged above the sensor; and a side surface portion arranged on the front surface side or a side surface side of the sensor below the roof portion. The roof portion has an eaves portion projecting outward with respect to the side surface portion, and the side surface portion has at least one first opening port
(Continued)

configured to introduce air to an inside of the sensor cover therethrough.

10 Claims, 10 Drawing Sheets

(51) Int. Cl.
   *F24F 11/89* (2018.01)
   *F24F 13/20* (2006.01)
   *F24F 13/22* (2006.01)
(52) U.S. Cl.
   CPC ......... *F24F 13/222* (2013.01); *F25B 2400/12* (2013.01); *F25B 2500/222* (2013.01)
(58) Field of Classification Search
   CPC ... F25B 2500/222; F25B 49/005; F25B 49/02
   USPC .......................................................... 62/125
   See application file for complete search history.

(56) References Cited

FOREIGN PATENT DOCUMENTS

| | | |
|---|---|---|
| JP | 2002-098346 A | 4/2002 |
| JP | 2009-093467 A | 4/2009 |
| JP | 2009-093468 A | 4/2009 |
| JP | 2012-107823 A | 6/2012 |
| JP | 5633986 B1 | 12/2014 |

OTHER PUBLICATIONS

Office Action dated Sep. 30, 2019 issued in corresponding CN patent application No. 201680074071.3 (and English translation).

* cited by examiner

AIR-CONDITIONING APPARATUS

CROSS REFERENCE TO RELATED APPLICATIONS

This application is a U.S. national stage application of PCT/JP2016/088168 filed on Dec. 21, 2016, which claims priority to International Application No. PCT/JP2015/085787, filed on Dec. 22, 2015, the contents of which are incorporated herein by reference.

TECHNICAL FIELD

The present invention relates to an air-conditioning apparatus including a sensor configured to detect leakage of refrigerant.

BACKGROUND ART

In Patent Literature 1, there is disclosed an indoor unit for an air-conditioning apparatus. The indoor unit includes a heat exchange chamber and a machine chamber. In the heat exchange chamber, a heat exchanger through which flammable refrigerant flows is arranged. In a lower part of the heat exchange unit, a drain pan configured to receive and drain condensate water generated in the heat exchanger is arranged. The drain pan extends from the lower part of the heat exchange chamber to a lower part of the machine chamber. A sensor configured to detect the flammable refrigerant is arranged in a vicinity of the drain pan in the lower part of the machine chamber. When the flammable refrigerant leaks from the heat exchanger, the flammable refrigerant is guided to the lower part of the machine chamber along the drain pan to be detected by the sensor.

In Patent Literature 2, there is disclosed a gas sensor. The gas sensor includes a gas detection device and a frame member configured to accommodate the gas detection device therein. A large number of air holes are formed in the frame member to cause indoor air to flow toward the gas detection device.

CITATION LIST

Patent Literature

Patent Literature 1: Japanese Unexamined Patent Application Publication No. 2002-98346
Patent Literature 2: Japanese Unexamined Utility Model Application Publication No. Sho 63-27859

SUMMARY OF INVENTION

Technical Problem

In the indoor unit disclosed in Patent Literature 1, the sensor is arranged in the vicinity of the drain pan. Therefore, for example, when a drainage path from the drain pan is clogged, the condensate water flowing over the drain pan sometimes drips onto the sensor.

In the gas sensor disclosed in Patent Literature 2, the air holes are formed in a top surface of the frame member. Therefore, when water drips onto the gas sensor, water disadvantageously enters an inside of the frame member through the air holes. Therefore, there is a problem in that the gas sensor may sometimes fail due to wetting with water.

The present invention has been made to solve the problem described above, and has an object to provide an air-conditioning apparatus capable of preventing a sensor configured to detect leakage of refrigerant from being wet with water.

Solution to Problem

According to one embodiment of the present invention, there is provided an air-conditioning apparatus, including: a refrigerant circuit configured to circulate refrigerant therethrough; and an indoor unit configured to accommodate at least a load-side heat exchanger of the refrigerant circuit, the indoor unit including: a casing; a drain pan, which is provided inside the casing, and is configured to receive condensate water generated in the load-side heat exchanger; and a refrigerant detection unit provided below the drain pan inside the casing, the refrigerant detection unit including: a sensor configured to detect leakage of the refrigerant; a sensor cover configured to cover the sensor from a front surface side of the sensor; and a mount plate arranged on a back surface side of the sensor, the sensor cover including: a roof portion arranged above the sensor; and a side surface portion arranged on the front surface side or a side surface side of the sensor below the roof portion, in which the roof portion has an eaves portion projecting outward with respect to the side surface portion, in which the side surface portion has at least one first opening port configured to introduce air to an inside of the sensor cover therethrough, and in which the mount plate has a slit into which one end of the roof portion is inserted.

Advantageous Effects of Invention

According to the present invention, an air-conditioning apparatus is capable of preventing a sensor configured to detect leakage of refrigerant from being wet with water.

DESCRIPTION OF EMBODIMENTS

Embodiment 1

Figure 1:
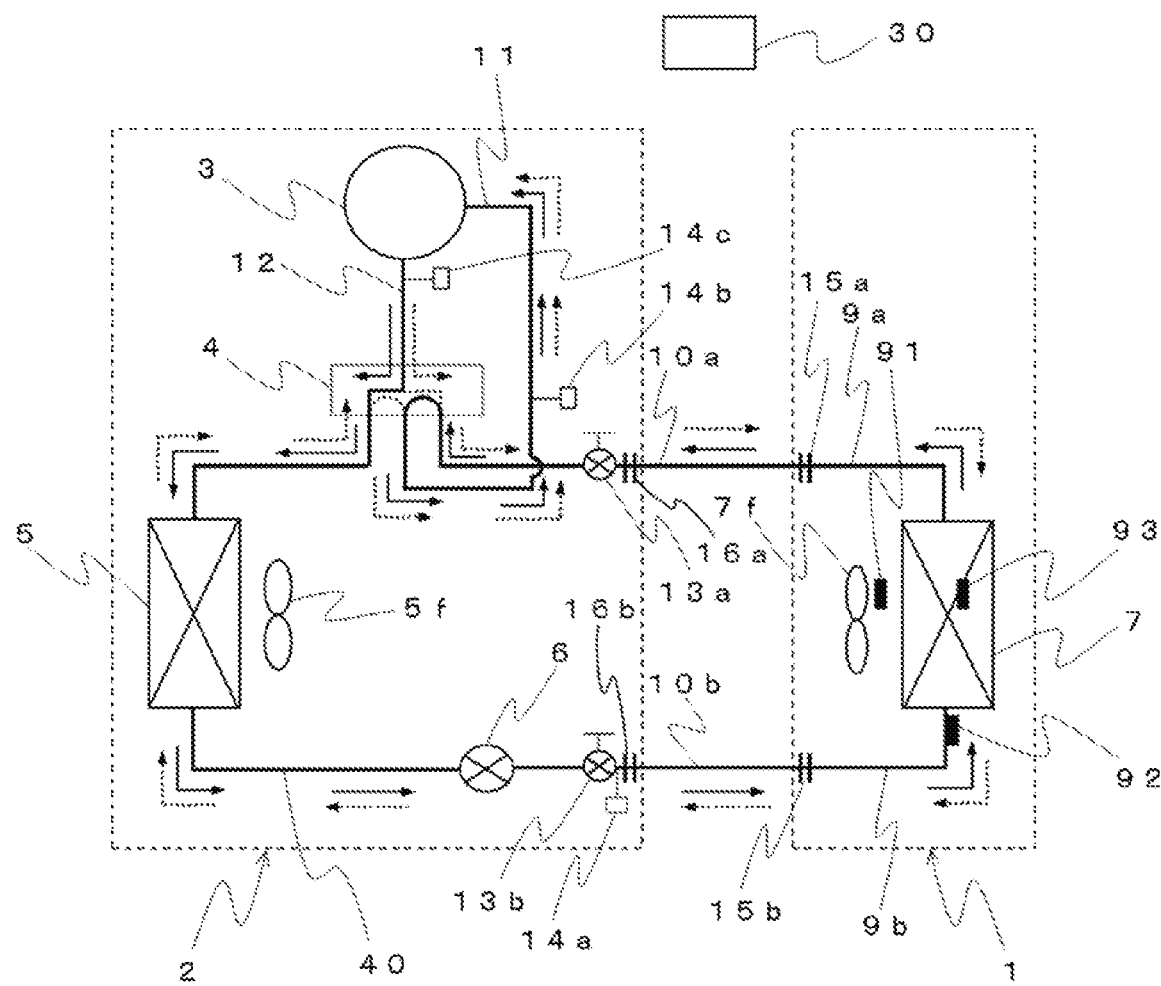
FIG. 1 is a refrigerant circuit diagram for illustrating a schematic configuration of an air-conditioning apparatus according to Embodiment 1 of the present invention.

An air-conditioning apparatus according to Embodiment 1 of the present invention is described. FIG. 1 is a refrigerant circuit diagram for illustrating a schematic configuration of the air-conditioning apparatus according to Embodiment 1. In the drawings including FIG. 1 referred to below, a dimensional relationship, a shape, or other devices of each component may differ from an actual one in some cases.

As illustrated in FIG. 1, the air-conditioning apparatus includes a refrigerant circuit 40 configured to circulate refrigerant therethrough. The refrigerant circuit 40 has a configuration in which a compressor 3, a refrigerant flow switching device 4, a heat source-side heat exchanger 5 (for example, an outdoor heat exchanger), a pressure reducing device 6, and a load-side heat exchanger 7 (for example, an indoor heat exchanger) are sequentially connected in an annular fashion through refrigerant pipes. Further, the air-conditioning apparatus includes, as a heat source unit, for example, an outdoor unit 2 installed outdoors. Further, the air-conditioning apparatus includes, as a load unit, for example, an indoor unit 1 installed indoors. The indoor unit 1 and the outdoor unit 2 are connected to each other through extension pipes 10a and 10b each being a part of the refrigerant pipes.

As refrigerant to circulate through the refrigerant circuit 40, for example, slightly flammable refrigerant such as HFO-1234yf or HFO-1234ze or strongly flammable refrigerant such as R290 or R1270 is used. Each of these refrigerants may be used as single refrigerant or may be used as a refrigerant mixture containing a mixture of two or more types of refrigerant. Hereinafter, refrigerant having flammability equal to or higher than a slightly flammable level (for example, class 2L or higher according to ASHRAE34 classification) is sometimes referred to as "flammable refrigerant". Further, nonflammable refrigerant such as R22 or R410A (for example, class 1 according to ASHRAE34 classification) may be used as the refrigerant to circulate through the refrigerant circuit 40. Each of these refrigerants has a density larger than that of air at an atmospheric pressure.

The compressor 3 is a fluid machine configured to compress sucked low-pressure refrigerant and discharge the compressed low-pressure refrigerant as high-pressure refrigerant. The refrigerant flow switching device 4 is configured to switch a direction of flow of the refrigerant inside the refrigerant circuit 40 for each of a cooling operation and a heating operation. As the refrigerant flow switching device 4, for example, a four-way valve is used. The heat source-side heat exchanger 5 is a heat exchanger functioning as a radiator (for example, a condenser) during the cooling operation and as an evaporator during the heating operation. In the heat source-side heat exchanger 5, the refrigerant flowing inside thereof and outdoor air supplied by an outdoor air-sending fan 5f described later exchange heat. The pressure reducing device 6 is configured to decompress the high-pressure refrigerant into low-pressure refrigerant.

As the pressure reducing device 6, for example, an electronic expansion valve with an adjustable opening degree or other valves is used. The load-side heat exchanger 7 is a heat exchanger functioning as an evaporator during the cooling operation and as a radiator (for example, a condenser) during the heating operation. In the load-side heat exchanger 7, the refrigerant flowing inside thereof and air supplied by an indoor air-sending fan 7f described later exchange heat. Here, the "cooling operation" is an operation of supplying low-temperature and low-pressure refrigerant to the load-side heat exchanger 7, and the "heating operation" is an operation of supplying high-temperature and high-pressure refrigerant to the load-side heat exchanger 7.

The compressor 3, the refrigerant flow switching device 4, the heat source-side heat exchanger 5, and the pressure reducing device 6 are accommodated in the outdoor unit 2. Further, the outdoor air-sending fan 5f configured to supply the outdoor air to the heat source-side heat exchanger 5 is accommodated in the outdoor unit 2. The outdoor air-sending fan 5f is installed so as to be opposed to the heat source-side heat exchanger 5. Through rotation of the outdoor air-sending fan 5f, an air flow passing through the heat source-side heat exchanger 5 is generated. As the outdoor air-sending fan 5f, for example, a propeller fan is used. The outdoor air-sending fan 5f is arranged on, for example, a downstream side of the heat source-side heat exchanger 5 in the air flow generated by the outdoor air-sending fan 5f.

In the outdoor unit 2, there are arranged a refrigerant pipe which connects an extension pipe connection valve 13a being a gas side during the cooling operation and the refrigerant flow switching device 4, a suction pipe 11 connected to a suction side of the compressor 3, a discharge pipe 12 connected to a discharge side of the compressor 3, a refrigerant pipe which connects the refrigerant flow switching device 4 and the heat source-side heat exchanger 5, a refrigerant pipe which connects the heat source-side heat exchanger 5 and the pressure reducing device 6, and a refrigerant pipe which connects an extension pipe connection valve 13b being a liquid side during the cooling operation and the pressure reducing device 6. The extension pipe connection valve 13a is made up of a two-way valve capable of switching between opening and closing, and has one end to which a joint portion 16a (for example, a flare joint) is mounted. The extension pipe connection valve 13b is made up of a three-way vale capable of switching between opening and closing. A service port 14a which is used for vacuuming being pre-work for filling the refrigerant circuit 40 with the refrigerant is mounted to one end of the extension pipe connection valve 13b, and a joint portion 16b (for example, a flare joint) is mounted to an other end thereof.

High-temperature and high-pressure gas refrigerant compressed in the compressor 3 flows through the discharge pipe 12 during both the cooling operation and the heating operation. Low-temperature and low-pressure gas refrigerant or two-phase refrigerant which has been subjected to an evaporation action flows through the suction pipe 11 during both the cooling operation and the heating operation. A service port 14b with a flare joint on a low-pressure side is connected to the suction pipe 11, and a service port 14c with a flare joint on a high-pressure side is connected to the discharge pipe 12. The service ports 14b and 14c are used to measure an operating pressure after connection of pressure meters thereto for a test operation carried out at the time when the air-conditioning apparatus is installed or repaired.

The load-side heat exchanger 7 is accommodated in the indoor unit 1. Further, the indoor air-sending fan 7f configured to supply air to the load-side heat exchanger 7 is accommodated in the indoor unit 1. Through rotation of the indoor air-sending fan 7f, an air flow passing through the load-side heat exchanger 7 is generated. As the indoor air-sending fan 7f, a centrifugal fan (for example, a sirocco fan or a turbo fan), a cross-flow fan, a mixed-flow fan, an axial fan (for example, a propeller fan), or other fans is used, depending on the configuration of the indoor unit 1. Although the indoor air-sending fan 7f of this example is arranged on an upstream side of the load-side heat exchanger 7 in the air flow generated by the indoor air-sending fan 7f, the indoor air-sending fan 7f may be arranged on a downstream side of the load-side heat exchanger 7.

In an indoor pipe 9a on the gas side included in the refrigerant pipes provided in the indoor unit 1, a joint portion 15a (for example, a flare joint) configured to connect the extension pipe 10a is provided at a connecting portion with the extension pipe 10a on the gas side. Further, in an indoor pipe 9b on the liquid side included in the refrigerant pipes provided in the indoor unit 1, a joint portion 15b (for example, a flare joint) configured to connect the extension pipe 10b is provided at a connecting portion with the extension pipe 10b on the liquid side.

Further, in the indoor unit 1, there are provided a sucked air temperature sensor 91 configured to detect a temperature of indoor air sucked from an indoor space, a heat exchanger liquid pipe temperature sensor 92 configured to detect a temperature of liquid refrigerant at an inlet portion of the load-side heat exchanger 7 during the cooling operation (outlet portion during the heating operation), a heat exchanger two-phase temperature sensor 93 configured to detect a temperature (evaporating temperature or condensing temperature) of two-phase refrigerant in the load-side heat exchanger 7, and other sensors. Each of the temperature sensors 91, 92, and 93 is configured to output a detection signal to a control unit 30 which controls the indoor unit 1 or the entire air-conditioning apparatus.

The control unit 30 includes a microcomputer including a CPU, a ROM, a RAM, an I/O port, a timer, and other components. The control unit 30 can perform mutual data communication with an operating unit 26 (see FIG. 2). The operating unit 26 is subjected to an operation performed by a user and outputs an operation signal generated based on the operation to the control unit 30. The control unit 30 of this example controls an operation of the indoor unit 1 or the entire air-conditioning apparatus including the operation of the indoor air-sending fan 7f based on an operation signal output from the operating unit 26, detection signals from the sensors, and other signals. The control unit 30 may be provided inside a casing of the indoor unit 1 or may be provided inside a casing of the outdoor unit 2. Further, the control unit 30 may include an outdoor unit control unit provided to the outdoor unit 2 and an indoor unit control unit provided to the indoor unit 1, which can perform data communication with the outdoor unit control unit.

Next, operations of the refrigerant circuit 40 of the air-conditioning apparatus are described. First, an operation during the cooling operation is described. In FIG. 1, the solid-line arrows indicate a direction of flow of the refrigerant during the cooling operation. During the cooling operation, a refrigerant flow passage is switched by the refrigerant flow switching device 4 as indicated by the solid lines to construct the refrigerant circuit 40 so that the low-temperature and low-pressure refrigerant flows through the load-side heat exchanger 7.

The high-temperature and high-pressure gas refrigerant discharged from the compressor 3 passes through the refrigerant flow switching device 4 to first flow into the heat source-side heat exchanger 5. During the cooling operation, the heat source-side heat exchanger 5 functions as the condenser. Specifically, in the heat source-side heat exchanger 5, the refrigerant flowing inside thereof and the outdoor air supplied by the outdoor air-sending fan 5f exchange heat to reject condensation heat of the refrigerant to the outdoor air. As a result, the refrigerant having flowed into the heat source-side heat exchanger 5 is condensed into high-pressure liquid refrigerant. The high-pressure liquid refrigerant flows into the pressure reducing device 6 to be decompressed into low-pressure two-phase refrigerant. The low-pressure two-phase refrigerant flows into the load-side heat exchanger 7 of the indoor unit 1 via the extension pipe 10b. During the cooling operation, the load-side heat exchanger 7 functions as the evaporator. Specifically, in the load-side heat exchanger 7, the refrigerant flowing inside thereof and the air (for example, the indoor air) supplied by the indoor air-sending fan 7f exchange heat to remove evaporation heat of the refrigerant from the air. As a result, the refrigerant having flowed into the load-side heat exchanger 7 evaporates into low-pressure gas refrigerant or two-phase refrigerant. Further, the air supplied by the indoor air-sending fan 7f is cooled through a heat removal action of the refrigerant. The low-pressure gas refrigerant or two-phase refrigerant evaporated in the load-side heat exchanger 7 is sucked into the compressor 3 via the extension pipe 10a and the refrigerant flow switching device 4. The refrigerant sucked into the compressor 3 is compressed into high-temperature and high-pressure gas refrigerant. During the cooling operation, the above-mentioned cycle is repeated.

Next, an operation during the heating operation is described. In FIG. 1, the dotted-line arrows indicate the direction of flow of the refrigerant during the heating operation. During the heating operation, the refrigerant flow passage is switched by the refrigerant flow switching device 4 as indicated by the dotted lines to construct the refrigerant circuit 40 so that high-temperature and high-pressure refrigerant flows through the load-side heat exchanger 7. During the heating operation, the refrigerant flows in the direction opposite to that during the cooling operation, and the load-side heat exchanger 7 functions as the condenser. Specifically, in the load-side heat exchanger 7, the refrigerant flowing inside thereof and the air supplied by the indoor air-sending fan 7f exchange heat to reject condensation heat of the refrigerant to the air. As a result, the air supplied by the indoor air-sending fan 7f is heated through a heat rejection action of the refrigerant.

Figure 2:
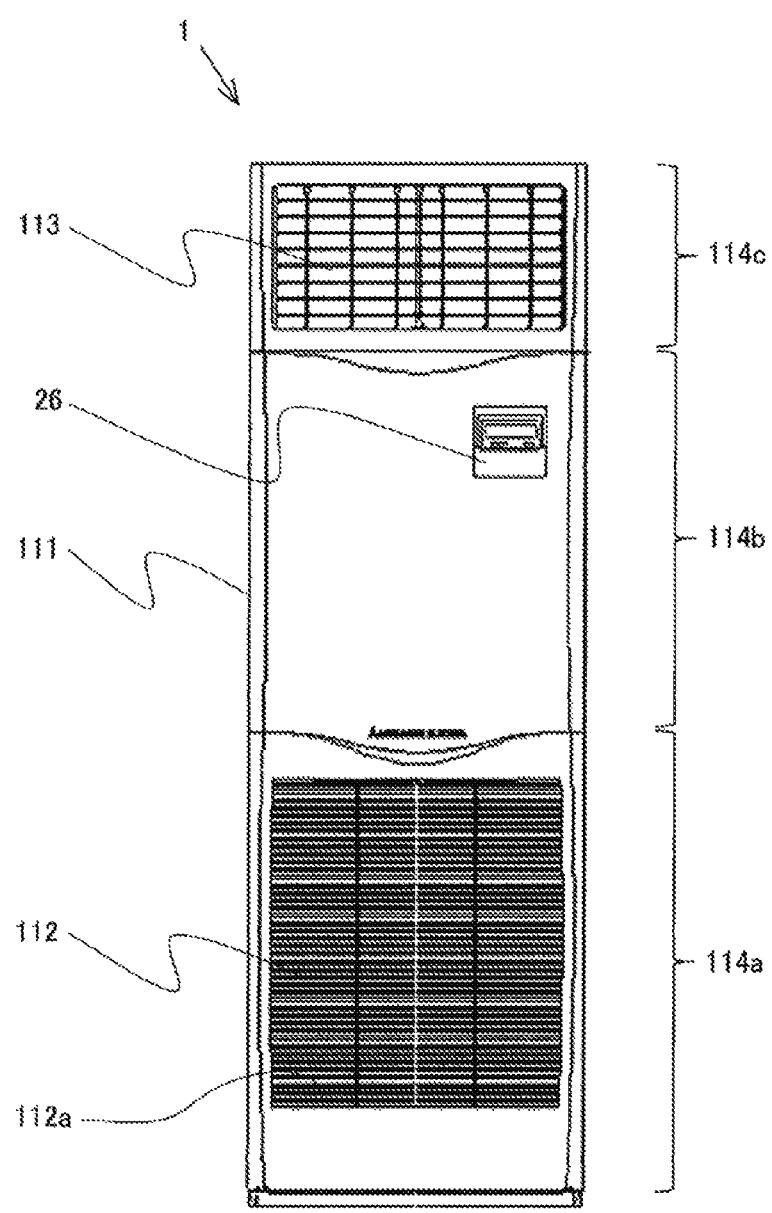
FIG. 2 is a front view for illustrating an external configuration of an indoor unit 1 of the air-conditioning apparatus according to Embodiment 1 of the present invention.
Figure 3:
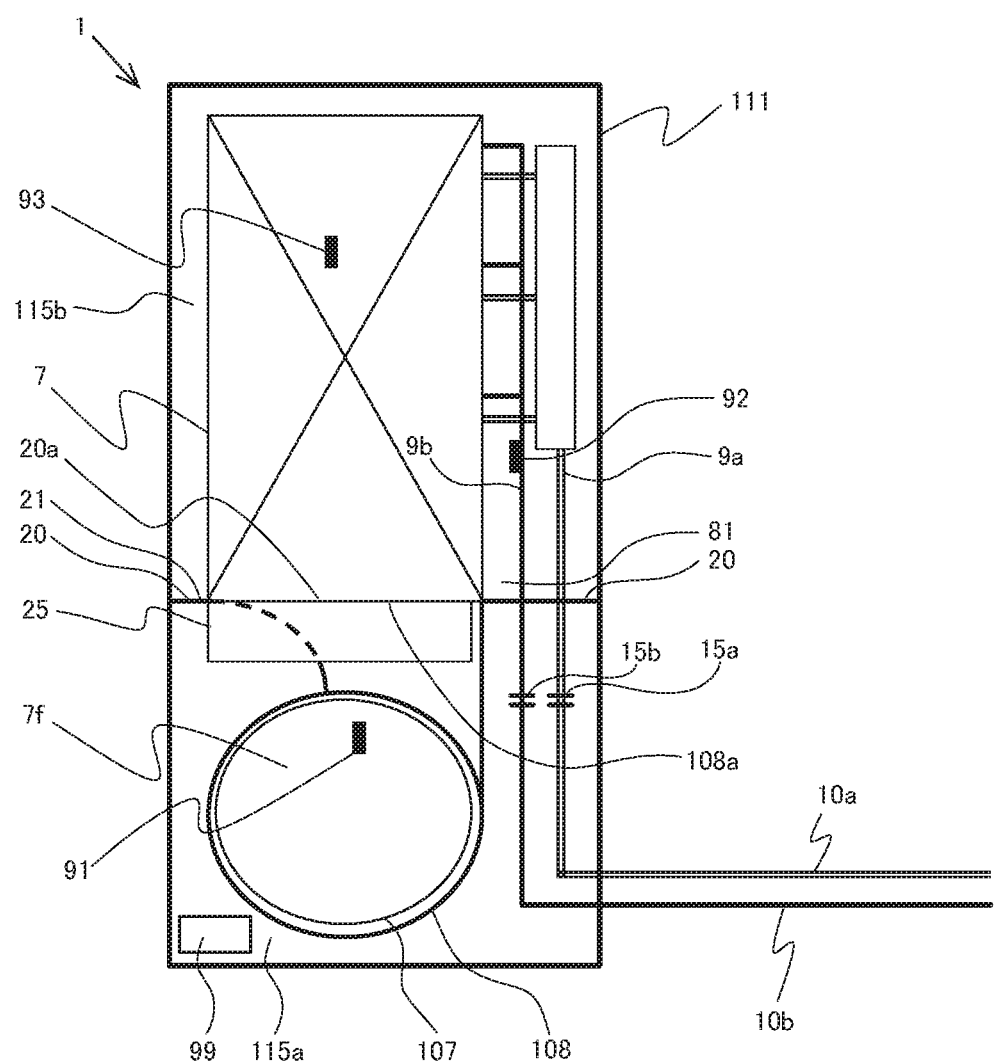
FIG. 3 is a front view for illustrating an internal structure of the indoor unit 1 of the air-conditioning apparatus according to Embodiment 1 of the present invention.
Figure 4:
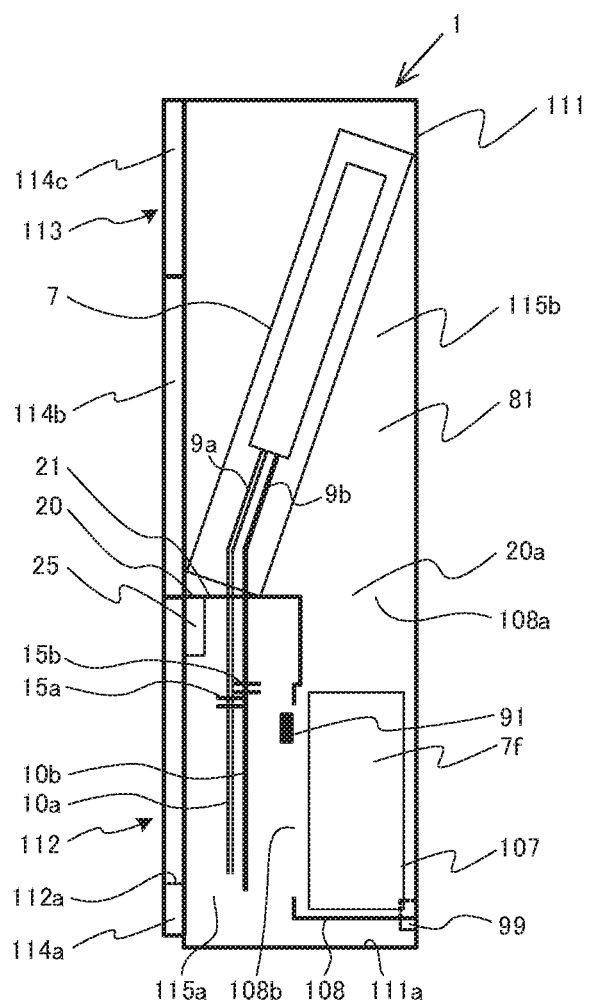
FIG. 4 is a side view for illustrating the internal structure of the indoor unit 1 of the air-conditioning apparatus according to Embodiment 1 of the present invention.

FIG. 2 is a front view for illustrating an external configuration of the indoor unit 1 of the air-conditioning apparatus according to Embodiment 1. FIG. 3 is a front view for schematically illustrating an internal structure of the indoor unit 1 of the air-conditioning apparatus according to Embodiment 1. FIG. 4 is a side view for schematically illustrating the internal structure of the indoor unit 1 of the air-conditioning apparatus according to Embodiment 1. The left side in FIG. 4 corresponds to a front surface side (indoor space side) of the indoor unit 1. In Embodiment 1, the floor-standing type indoor unit 1 to be installed on a floor surface of the indoor space being an air-conditioned space is exemplified as the indoor unit 1. In the following description, a positional relationship (for example, a vertical relationship) of the components is essentially described as that when the indoor unit 1 is installed in a usable state.

As illustrated in FIG. 2 to FIG. 4, the indoor unit 1 includes a casing 111 having a vertically long cuboidal shape. An air inlet 112 configured to suck air in the indoor space therethrough is formed in a lower part of a front surface of the casing 111. The air inlet 112 of this example is formed at a position lower than a central portion in an up-and-down direction of the casing 111, which is in a vicinity of the floor surface. In an upper part of the front surface of the casing 111, specifically, at a position higher than the air inlet 112 (for example, above the central portion in the up-and-down direction of the casing 111), an air outlet 113 configured to blow out the air sucked through the air inlet 112 therefrom is formed. The operating unit 26 is provided above the air inlet 112 and below the air outlet 113 on the front surface of the casing 111. The operating unit 26 is connected to the control unit 30 through a communication line and can perform mutual data communication with the control unit 30. On the operating unit 26, an operation for starting the operation of the air-conditioning apparatus, an operation for ending the operation of the air-conditioning apparatus, switching between operation modes, setting of a preset temperature and a preset air volume, and other operations are performed by a user's operation. The operating unit 26 includes a display portion, an audio output portion, or other portions as a notification portion configured to notify the user of information.

The casing 111 is a hollow box member and has a front opening portion formed on a front side of the casing 111. The casing 111 includes a first front panel 114a, a second front panel 114b, and a third front panel 114c, which are removably mounted to the front opening portion. Each of the first front panel 114a, the second front panel 114b, and the third front panel 114c has an approximately rectangular flat plate-like outer shape. The first front panel 114a is removably mounted to a lower part of the front opening portion of the casing 111. The air inlet 112 described above is formed in the first front panel 114a. The second front panel 114b is arranged above the first front panel 114a so as to be adjacent thereto and is removably mounted to a central portion of the front opening portion of the casing 111 in the up-and-down direction. The operating unit 26 described above is provided on the second front panel 114b. The third front panel 114c is arranged above the second front panel 114b so as to be adjacent thereto and is removably mounted to an upper part of the front opening portion of the casing 111. The air outlet 113 described above is formed in the third front panel 114c.

An internal space of the casing 111 is roughly divided into a lower space 115a and an upper space 115b. The lower space 115a serves as an air-sending portion. The upper space 115b is positioned above the lower space 115a, and serves as a heat exchange portion. The lower space 115a and the upper space 115b are partitioned by a partition portion 20. The partition portion 20 has, for example, a flat plate-like shape and is arranged approximately horizontal. The partition portion 20 at least has an air passage opening port 20a serving as an air passage between the lower space 115a and the upper space 115b. The lower space 115a is exposed on a front surface side when the first front panel 114a is removed from the casing 111. The upper space 115b is exposed on the front surface side when the second front panel 114b and the third front panel 114c are removed from the casing 111. Specifically, a height at which the partition portion 20 is installed approximately matches with a height of an upper end of the first front panel 114a or a height of a lower end of the second front panel 114b. In this case, the partition portion 20 may be formed integrally with a fan casing 108 described later, may be formed integrally with a drain pan 21 described later, or may be formed independently of the fan casing 108 and the drain pan 21.

In the lower space 115a, there is arranged the indoor air-sending fan 7f configured to generate a flow of air from the air inlet 112 toward the air outlet 113 in an air passage 81 inside the casing 111. The indoor air-sending fan 7f of this example is a sirocco fan including a motor (not shown) and an impeller 107. The impeller 107 is connected to an output shaft of the motor, and includes a plurality of blades which are arranged, for example, at equal intervals in a circumferential direction of the impeller 107. A rotary shaft of the impeller 107 is arranged so as to be approximately parallel to a depth direction of the casing 111. As the motor of the indoor air-sending fan 7f, a non-brush type motor (for example, an induction motor or a DC brushless motor) is used. Therefore, sparks are not generated when the indoor air-sending fan 7f rotates.

The impeller 107 of the indoor air-sending fan 7f is covered with the fan casing 108 having a spiral shape. The fan casing 108 is, for example, formed independently of the casing 111. In a vicinity of a spiral center of the fan casing 108, an inlet opening port 108b configured to suck the indoor air into the fan casing 108 through the air inlet 112 is formed. The suction opening port 108b is arranged so as to be opposed to the air inlet 112. Further, in a tangential direction to the spiral of the fan casing 108, an outlet opening port 108a configured to blow out sent air is formed. The outlet opening port 108a is arranged so as to be oriented upward and is connected to the upper space 115b through the air passage opening port 20a of the partition portion 20. In other words, the outlet opening port 108a communicates with the upper space 115b through the air passage opening port 20a. An opening edge of the outlet opening port 108a and an opening edge of the air passage opening port 20a may be directly connected to each other or may be indirectly connected to each other through a duct member or other members.

Further, in the lower space 115a, there is provided an electrical component box 25 in which, for example, the microcomputer constructing the control unit 30, various electrical components, a board, and other components are accommodated.

The upper space 115b is positioned on a downstream side of the lower space 115a in the flow of air generated by the indoor air-sending fan 7f. The load-side heat exchanger 7 is arranged in the air passage 81 inside the upper space 115b. Below the load-side heat exchanger 7, the drain pan 21 configured to receive the condensate water condensed on surfaces of the load-side heat exchanger 7 is provided. The drain pan 21 may be formed as a part of the partition portion 20 and may be formed independently of the partition portion 20 to be arranged on the partition portion 20.

The indoor pipes 9a and 9b connected to the load-side heat exchanger 7 pass completely through the partition portion 20 to be drawn downward from the upper space 115b into the lower space 115a. The joint portion 15a, which connects the indoor pipe 9a and the extension pipe 10a to each other, and the joint portion 15b, which connects the indoor pipe 9a and the extension pipe 10b to each other, are arranged in the lower space 115a. The indoor units 9a and 9b, the extension pipes 10a and 10b, and the joint portions 15a and 15b are arranged on one side (on the right side in FIG. 3) with respect to a center in a right-and-left direction of the indoor unit 1.

In a vicinity of a bottom portion of the lower space 115a, a refrigerant detection unit 99 configured to detect leakage of the refrigerant is provided. The refrigerant detection unit 99 detects, for example, a refrigerant concentration in air around the refrigerant detection unit 99 and outputs a detection signal to the control unit 30. The control unit 30 determines whether or not the leakage of the refrigerant occurs based on the detection signal output from the refrigerant detection unit 99. As the refrigerant detection unit 99, a gas sensor (for example, a semiconductor gas sensor or a hot wire semiconductor gas sensor) is used.

The refrigerant detection unit 99 is provided, for example, below the load-side heat exchanger 7, the drain pan 21, and the joint portions 15a and 15b. In the indoor unit 1, the leakage of the refrigerant is liable to occur at a brazed portion of the load-side heat exchanger 7 and the joint portions 15a and 15b. Therefore, when refrigerant having a density larger than that of air is used at the atmospheric pressure, the leakage of the refrigerant can be more reliably detected by the refrigerant detection unit 99 provided below the load-side heat exchanger 7 and the joint portions 15a and 15b.

The refrigerant detection unit 99 is mounted along any one of a left side surface, a back surface, and a right side surface included in inner wall surfaces of the casing 111. The first front panel 114a is removed and mounted when the indoor unit 1 is installed or in other cases. Therefore, the refrigerant detection unit 99 is mounted to any one of the inner wall surfaces of the casing 111 other than the front surface. Further, the refrigerant detection unit 99 is arranged on an other side (on the left side in FIG. 3) corresponding to the direction opposite to that of the position of arrangement of the indoor pipes 9a and 9b, the extension pipes 10a and 10b, and the joint portions 15a and 15b, in a right-and-left direction of the indoor unit 1. In this manner, ease of routing of the extension pipes 10a and 10b can be ensured. Further, the joint portions 15a and 15b and the pipes therearound are covered with a heat insulating material after the indoor units 9a and 9b and the extension pipes 10a and 10b are respectively connected by an installation worker for the indoor unit 1. Depending on accuracy of work when the installation worker mounts the heat insulating material, however, dew condensation sometimes occurs at the joint portions 15a and 15b and the pipes therearound, as a result of a gap between the heat insulating materials. With the arrangement of the refrigerant detection unit 99 as described above, even when the dew condensation occurs at the joint portions 15a and 15b and the pipes therearound, dripping of water on the refrigerant detection unit 99 can be prevented.

Further, the refrigerant detection unit 99 is provided to inside the lower space 115a and within a height range equal to or lower than a height of an opening lower edge 112a of the air inlet 112 and equal to or higher than a height of a bottom surface portion 111a of the casing 111 (see FIG. 4). The opening lower edge 112a of the air inlet 112 is positioned above the bottom surface portion 111a of the casing 111. In this example, the whole refrigerant detection unit 99 is arranged within the height range described above. However, as long as at least a sensor device 201 (described later) of the refrigerant detection unit 99 is arranged within the height range described above, the refrigerant detection unit 99 may be partially provided above the height range described above. In the bottom portion of the lower space 115a, a recessed portion having a small volume which is open upward is formed within the height range described above. When refrigerant having a density larger than that of air is used at the atmospheric pressure, only a small part of the leaking refrigerant remains in the recessed portion without flowing out of the casing 111. Therefore, the leakage of the refrigerant can be more reliably detected by the refrigerant detection unit 99 provided in the recessed portion. Only a small amount of refrigerant remains in the recessed portion, and no ignition source such as an electrical component is provided in the recessed portion. Therefore, there is no fear of unexpected ignition.

Next, an operation of the indoor unit 1 is described. When the indoor air-sending fan 7f is driven, the indoor air is sucked through the air inlet 112. The sucked indoor air passes through the load-side heat exchanger 7 to turn into the conditioned air to be blown out into the indoor space through the air outlet 113.

For example, when the leakage of the refrigerant occurs at the brazed portion of the load-side heat exchanger 7, the joint portion 15a or 15b, or other portions under a state in which the indoor air-sending fan 7f is stopped, the control unit 30 detects the leakage of the refrigerant based on the detection signal from the refrigerant detection unit 99. When the leakage of the refrigerant is detected, the control unit 30 starts the operation of the indoor air-sending fan 7f. In this manner, the leaking refrigerant can be diffused. Thus, the refrigerant concentration can be prevented from being locally increased in the indoor space. Therefore, even when the flammable refrigerant is used as the refrigerant, formation of a flammable concentration region in the indoor space can be prevented. A rotation speed of the indoor air-sending fan 7f is not limited to a rotation speed used during a normal operation, and may be a specific rotation speed which allows the refrigerant to be fully diffused even when a refrigerant leakage amount is maximum. Rotation time of the indoor air-sending fan 7f may be time which allows the entire refrigerant to be diffused even when a maximum refrigerant amount which has a possibility of being sealed in the air-conditioning apparatus is continuously leaking at a minimum leakage speed for generating a flammable concentration.

Further, when the leakage of the refrigerant is detected, the control unit 30 may use the display portion, the audio output portion, or other portions included in the operating unit 26 to notify the user of the leakage of the refrigerant. Further, when the leakage of the refrigerant is detected, the control unit 30 may forcibly stop the compressor 3 or inhibit activation of the compressor 3.

Figure 5:
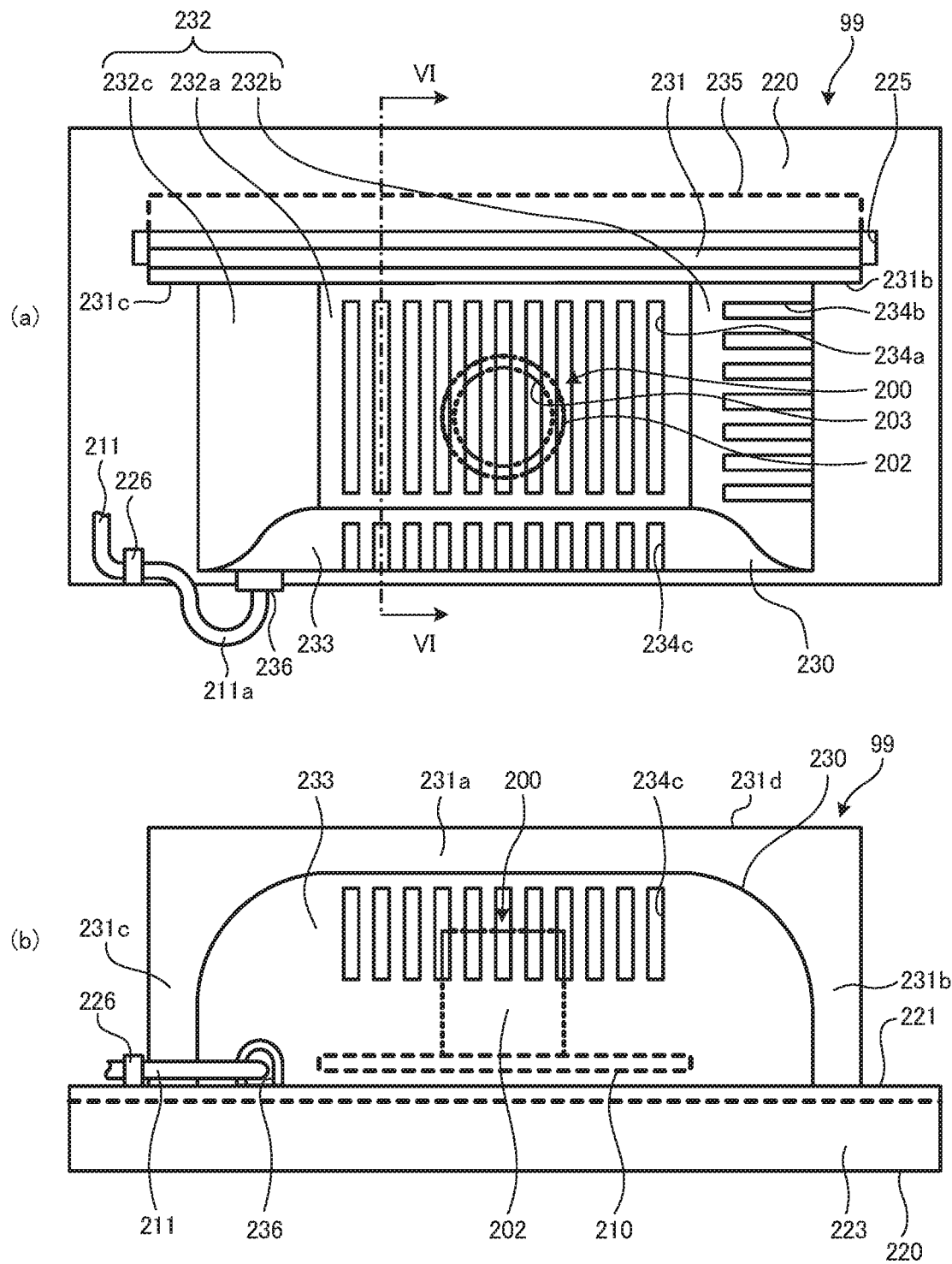
FIG. 5 are views for illustrating a configuration of a refrigerant detection unit 99 of the air-conditioning apparatus according to Embodiment 1 of the present invention.
Figure 6:
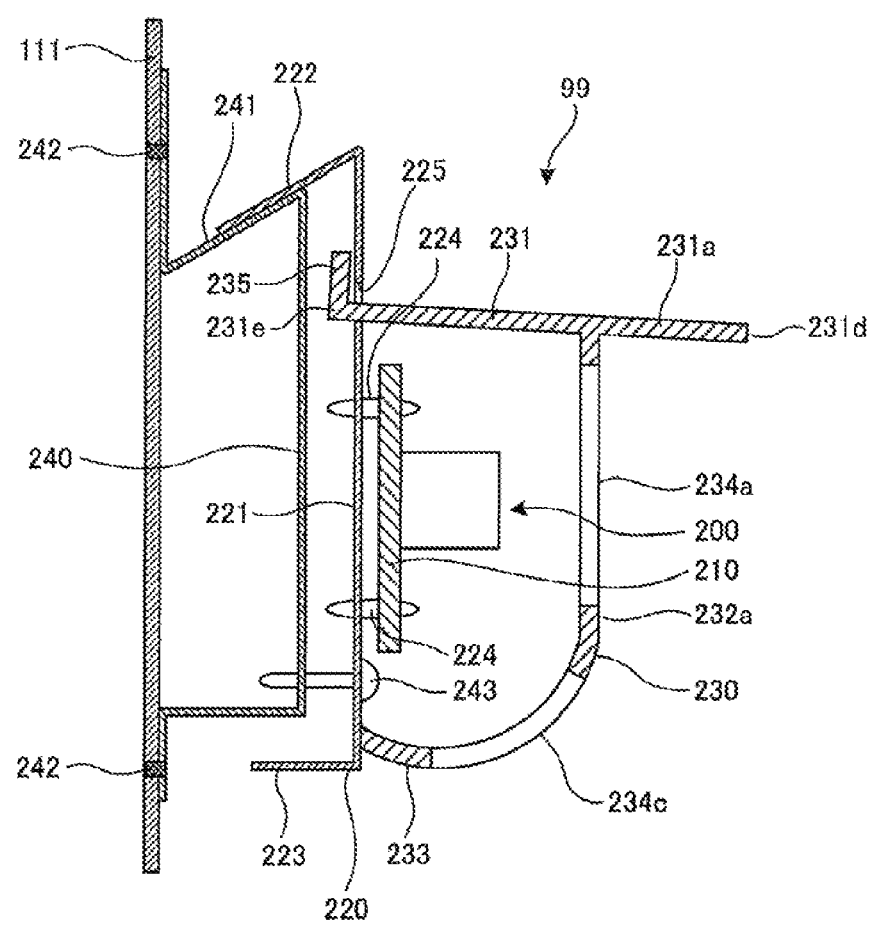
FIG. 6 is a sectional view for illustrating a cross section taken along the line VI-VI in FIG. 5.

FIG. 5 are views for illustrating a configuration of the refrigerant detection unit 99 of the air-conditioning apparatus according to Embodiment 1. FIG. 5 include a front view (a) and a bottom view FIG. 5(b) of the refrigerant detection unit 99. FIG. 6 is a sectional view for illustrating a cross section taken along the line VI-Vi in FIG. 5. In FIG. 6, a configuration of a mount base 240 on the casing 111 side, to which the refrigerant detection unit 99 is mounted, is also illustrated. The near side on the drawing sheet in FIG. 5(a), the upper side in FIG. 5(b), and the right side in FIG. 6 correspond to the front surface side of the sensor 200. The far side on the drawing sheet in FIG. 5(b), the lower side in FIG. 5(b), and the left side in FIG. 6 correspond to the back surface side of the sensor 200. In the following description, the front surface side of the sensor 200 and the back surface side of the sensor 200 are sometimes simply referred to as "front surface side" and "back surface side", respectively. In Embodiment 1, the refrigerant detection unit 99 is mounted to the back surface side (specifically, a rear panel) among the inner wall surfaces of the casing 111. Therefore, an orientation of the front surface side and an orientation of the back surface side of the sensor 200 match with an orientation of the front surface side and an orientation of the back surface side of the indoor unit 1, respectively. However, in some cases, depending on a position at which the refrigerant detection unit 99 is mounted, the orientation of the front surface side and the orientation of the back surface side of the sensor 200 do not match with the orientation of the front surface side and the orientation of the back surface side of the indoor unit 1, respectively.

As illustrated in FIG. 5 and FIG. 6, the refrigerant detection unit 99 includes the sensor 200, a mount plate 220, and a sensor cover 230. The mount plate 220 is arranged on the back surface side of the sensor 200. The sensor cover 230 covers the sensor 200 from the front surface side and surrounds the sensor 200 together with the mount plate 220. The refrigerant detection unit 99 has a configuration in which the sensor 200, the mount plate 220, and the sensor cover 230 are integrally assembled. Hereinafter, the refrigerant detection unit 99 is sometimes referred to as "sensor assembly". The refrigerant detection unit 99 is mounted to the mount base 240 provided on the back surface side among the inner wall surfaces of the casing 111.

The sensor 200 includes the sensor device 201 (see FIG. 7), a board 210, and a tubular container 202. The board 210 is configured to receive the sensor device 201 mounted thereon. A tubular container 202 has a cylindrical shape, and is configured to accommodate the sensor device 201 therein. Under a state in which the refrigerant detection unit 99 is mounted on the mount base 240, the board 210 is arranged upright so that a board surface becomes approximately parallel to a vertical direction. The sensor device 201 is mounted on a front surface side of the board 210. The tubular container 202 is fixed to the front surface side of the board 210 so that an axial direction thereof becomes perpendicular to the board 210. A back surface side of the tubular container 202, which is one axial end side, is held in contact with a front surface of the board 210. On a front surface side of the tubular container 202, which is an other axial end side, an opening port 203 (example of a second opening port) configured to introduce air to the inside of the tubular container 202 therethrough is formed. The sensor 200 is mounted so that the axial direction of the tubular container 202 becomes horizontal and the opening port 203 is oriented in the horizontal direction. A mesh portion 204 (see FIG. 7) may be provided to the opening port 203 so as to prevent a foreign substance from entering the tubular container 202.

Figure 7:
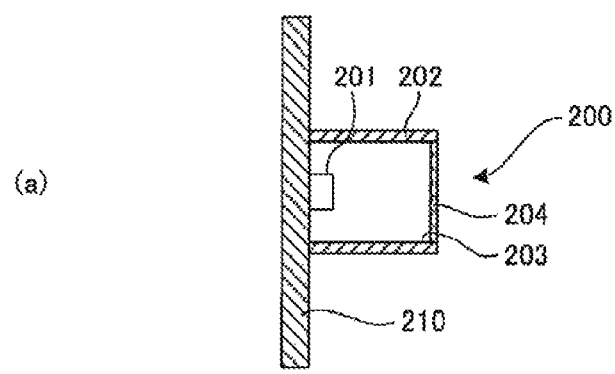
FIG. 7 are views for illustrating examples of a mounting posture of a sensor 200 in the air-conditioning apparatus according to Embodiment 1 of the present invention.
Figure 7:
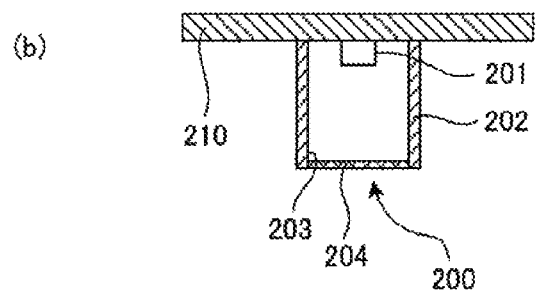
Figure 7:
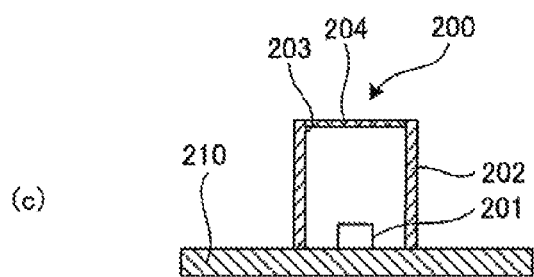

FIG. 7 are views for illustrating examples of a mounting posture of the sensor 200 in the air-conditioning apparatus according to Embodiment 1. In the example illustrated in FIG. 7(a), as in the configuration illustrated in FIG. 5 and FIG. 6, the sensor 200 is mounted so that the opening port 203 is oriented in the horizontal direction. In the example illustrated in FIG. 7(b), the sensor 200 is mounted so that the opening port 203 is oriented vertically downward. In the example illustrated in FIG. 7(c), the sensor 200 is mounted so that the opening port 203 is oriented vertically upward.

It is desired that the sensor 200 be mounted so that the opening port 203 is oriented in the horizontal direction as illustrated in FIG. 7(a) or so that the opening port 203 is oriented downward as illustrated in FIG. 7(b). Here, the "downward" includes not only vertically downward but also obliquely downward. As a result, a foreign substance or water can be prevented from entering the tubular container 202. Further, when refrigerant having a density larger than that of air leaks, the refrigerant starts accumulating on the bottom portion of the casing 111. Therefore, through mounting of the sensor 200 so that the opening port 203 is oriented in the horizontal direction or downward, the leakage of the refrigerant can be detected in an early stage.

Referring back to FIG. 5 and FIG. 6, the mount plate 220 has a structure in which an upper end and a lower end of a rectangular sheet metal are bent toward the back surface side. The mount plate 220 includes a flat plate portion 221, an upper end portion 222 (example of a locking portion), and a lower end portion 223. The flat plate portion 221 receives the board 210 mounted thereto. The upper end portion 222 is bent at an acute angle toward the back surface side with respect to the flat plate portion 221. The lower end portion 223 is bent at a right angle toward the back surface side with respect to the flat plate portion 221. Under a state in which the refrigerant detection unit 99 is mounted to the mount base 240, the flat plate portion 221 is arranged so as to become approximately parallel to the vertical direction. The flat plate portion 221 supports the board 210 through a plurality of support members 224. A slit 225 into which one end of a roof portion 231 described later is inserted is formed in the flat plate portion 221 above a portion which supports the board 210.

The sensor cover 230 includes the roof portion 231, a side surface portion 232, and a bottom surface portion 233. The roof portion 231 is arranged above the sensor 200. The side surface portion 232 is arranged on the front surface side and side surface sides of the sensor 200 below the roof portion 231. The bottom surface portion 233 is arranged below the sensor 200. The side surface portion 232 includes a front surface portion 232a, a right side surface portion 232b, and a left side surface portion 232c. The front surface portion 232a is arranged on the front surface side of the sensor 200. The right side surface portion 232b is arranged on a right side surface of the sensor 200. The left side surface portion 232c is arranged on a left side surface of the sensor 200. The sensor cover 230 covers the sensor 200 in five directions except for a direction from the back surface side of the sensor 200. In this manner, the sensor cover 230 surrounds the sensor 200 omnidirectionally together with the mount plate 220 arranged on the back surface side of the sensor 200. The sensor cover 230 is made of, for example, a resin.

The roof portion 231 has an eaves portion 231a, an eaves portion 231b, and an eaves portion 231c. The eaves portion 231a projects outward (specifically, toward the front surface side) with respect to the front surface portion 232a. The eaves portion 231b projects outward (specifically, toward the right side) with respect to the right side surface portion 232b. The eaves portion 231c projects outward (specifically, toward the left side) with respect to the left side surface portion 232c. The roof portion 231 is inclined so that a height thereof becomes smaller toward one end portion 231d being a distal end of the eaves portion 231a. A weir portion 235 extending upward is formed at an other end portion 231e of the roof portion 231. The weir portion 235 and the end portion 231e are inserted into the slit 225 formed in the mount plate 220 and are positioned on the back surface side with respect to the mount plate 220.

A plurality of opening ports 234a (example of a first opening port) configured to introduce air to the inside of the sensor cover 230 therethrough are formed in the front surface portion 232a so as to ensure detectability for the leaking refrigerant. Similarly, a plurality of opening ports 234b (example of the first opening port) are formed in the right side surface portion 232b. A plurality of opening ports 234c (example of the first opening port) are formed in the bottom surface portion 233. Each of the opening ports 234a, 234b, and 234c has a slit-like opening shape. The roof portion 231 has no opening port configured to introduce air to the inside of the sensor cover 230 therethrough.

In Embodiment 1, the opening ports 234a and the opening ports 234b are respectively formed in the front surface portion 232a and the right side surface portion 232b included in the side surface portion 232, which are surfaces on the joint portion 15a side and the joint portion 15b side, respectively. Therefore, the leakage of the refrigerant from the joint portions 15a and 15b can be more reliably detected. Further, in Embodiment 1, no opening port is formed in the left side surface portion 232c included in the side surface portion 232, which is a surface on a side wall side of the casing 111. However, an opening port may be formed in the left side surface portion 232c.

Further, in Embodiment 1, the opening ports are formed in each of the side surface portion 232 (in this example, the front surface portion 232a and the right side surface portion 232b) and the bottom surface portion 233. Therefore, air or gas having a density smaller than that of air can be prevented from remaining inside the sensor cover 230. For example, when the leaking refrigerant having a density larger than that of air flows through the opening ports 234c of the bottom surface portion 233 to the inside of the sensor cover 230, air or the gas having a density smaller than that of air which is present inside the sensor cover 230 can be allowed to flow out through the opening ports 234a and 234b of the side surface portion 232. In this manner, the detection of leakage of the refrigerant can be prevented from being delayed.

A total opening area obtained by summing up opening areas of the opening ports 234a, 234b, and 234c is larger than an opening area of the opening port 203 of the tubular container 202. In view of prevention of entry of water into the inside of the sensor cover 230, it is desired that the total opening area of the opening ports 234a, 234b, and 234c be small. When the total opening area of the opening ports 234a, 234b, and 234c is small, however, the detectability for the leaking refrigerant becomes low in some cases. The total opening area of the opening ports 234a, 234b, and 234c is set larger than the opening area of the opening port 203 in Embodiment 1. Therefore, the detectability for the leaking refrigerant can be prevented from being lowered, while water is prevented from entering the inside of the sensor cover 230.

Further, an insertion hole 236 which is open downward is formed in the bottom surface portion 233. A lead wire 211 connected to the board 210 is inserted through the insertion hole 236. The lead wire 211 drawn out through the insertion hole 236 is supported by a lead wire support portion 226 provided to the mount plate 220 and extends upward toward the electrical component box 25 provided above the refrigerant detection unit 99. The lead wire 211 has a bent portion 211a which is bent in a U-like shape so as to protrude downward between a portion inserted through the insertion hole 236 and a portion supported by the lead wire support portion 226. The bent portion 211a is positioned below the insertion hole 236. In this manner, water can be prevented from entering the inside of the sensor cover 230 along the lead wire 211.

The mount base 240 has a structure in which each of an upper portion and a lower portion of the rectangular sheet metal is bent in a Z-like shape. Two bent portions on the upper side are bent at an acute angle similarly to the upper end portion 222 of the mount plate 220. In this manner, an inclined surface 241 (example of a locked portion) which is inclined upward so that a height on the casing 111 side (rear panel side) becomes lower is formed on the mount base 240. The mount base 240 is fixed onto the rear surface side among the inner wall surfaces of the casing 111 through a plurality of welding portions 242 formed by, for example, spot welding.

Under a state in which the refrigerant detection unit 99 is mounted onto the mount base 240, the inclined surface 241 of the mount base 240 and a lower surface of the upper end portion 222 of the mount plate 220 are held in surface contact with each other. In this manner, a surface seal is formed between the inclined surface 241 and the upper end portion 222. Further, the mount plate 220 is fixed to the mount base 240 by using a fastening member such as a screw 243.

Figure 8:
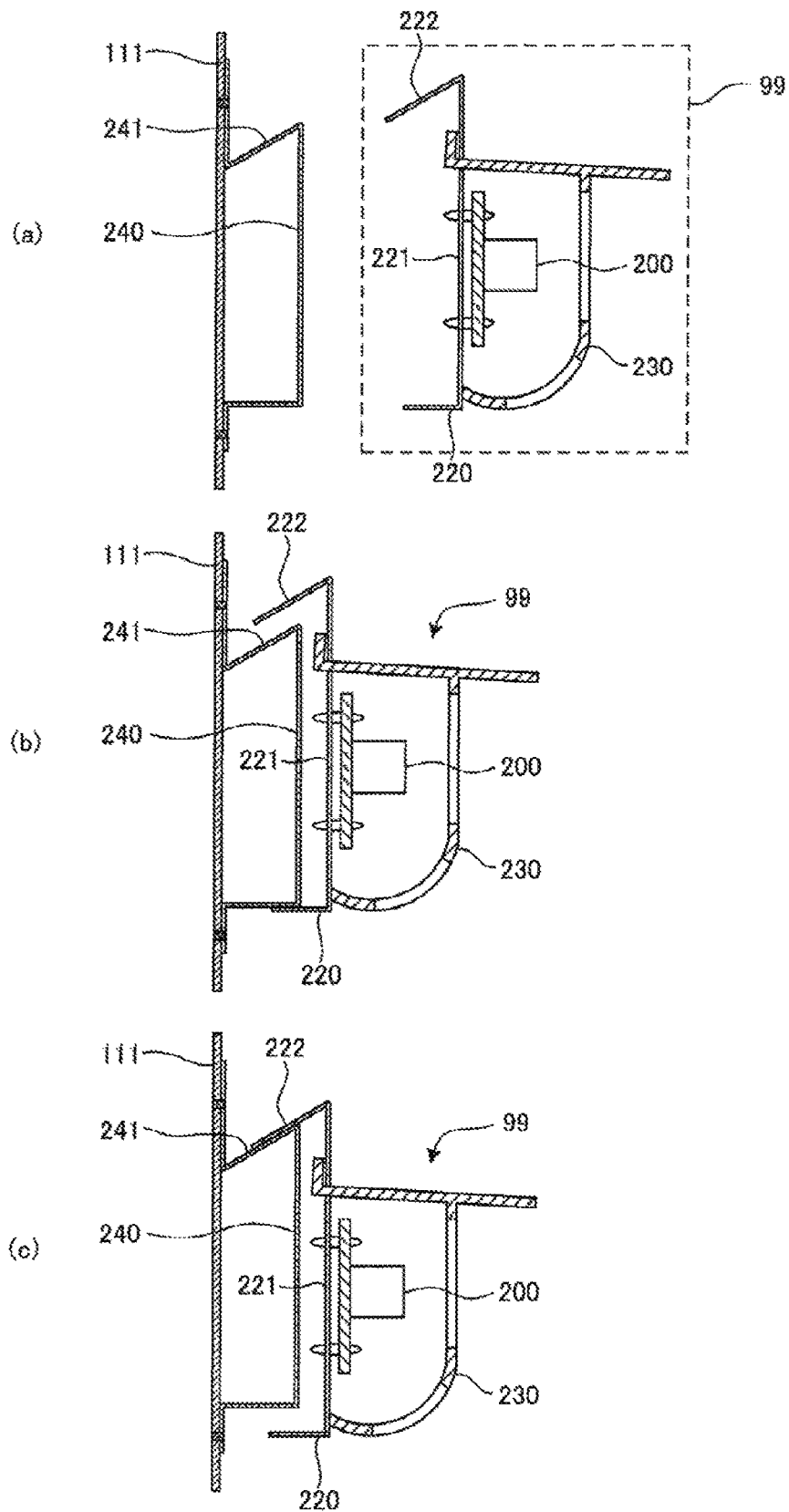
FIG. 8 are views for illustrating an example of a procedure of mounting the refrigerant detection unit 99 to a mount base 240 in the air-conditioning apparatus according to Embodiment 1 of the present invention.

FIG. 8 are views for illustrating an example of a procedure of mounting the refrigerant detection unit 99 to the mount base 240 in the air-conditioning apparatus according to Embodiment 1. As illustrated in FIG. 8(a), the refrigerant detection unit 99 has a configuration in which the sensor 200, the mount plate 220, and the sensor cover 230 are integrated into an assembly before being mounted to the mount base 240. As illustrated in FIG. 8(b) and FIG. 8(c), the refrigerant detection unit 99 is temporarily hooked to the mount base 240 so that the lower surface of the upper end portion 222 of the mount plate 220 and the inclined surface 241 of the mount base 240 are held in surface contact with each other. In this manner, the refrigerant detection unit 99 can be positioned with respect to the casing 111. Further, the upper end portion 222 is bent at an acute angle with respect to the flat plate portion 221, and hence the upper end portion 222 is locked to the mount base 240. Therefore, the temporarily hooked refrigerant detection unit 99 can be prevented from falling off the mount base 240. Thereafter, the refrigerant detection unit 99 which is temporarily hooked onto the mount base 240 is fixed to the mount base 240 by using the fastening member such as the screw 243.

Figure 9:
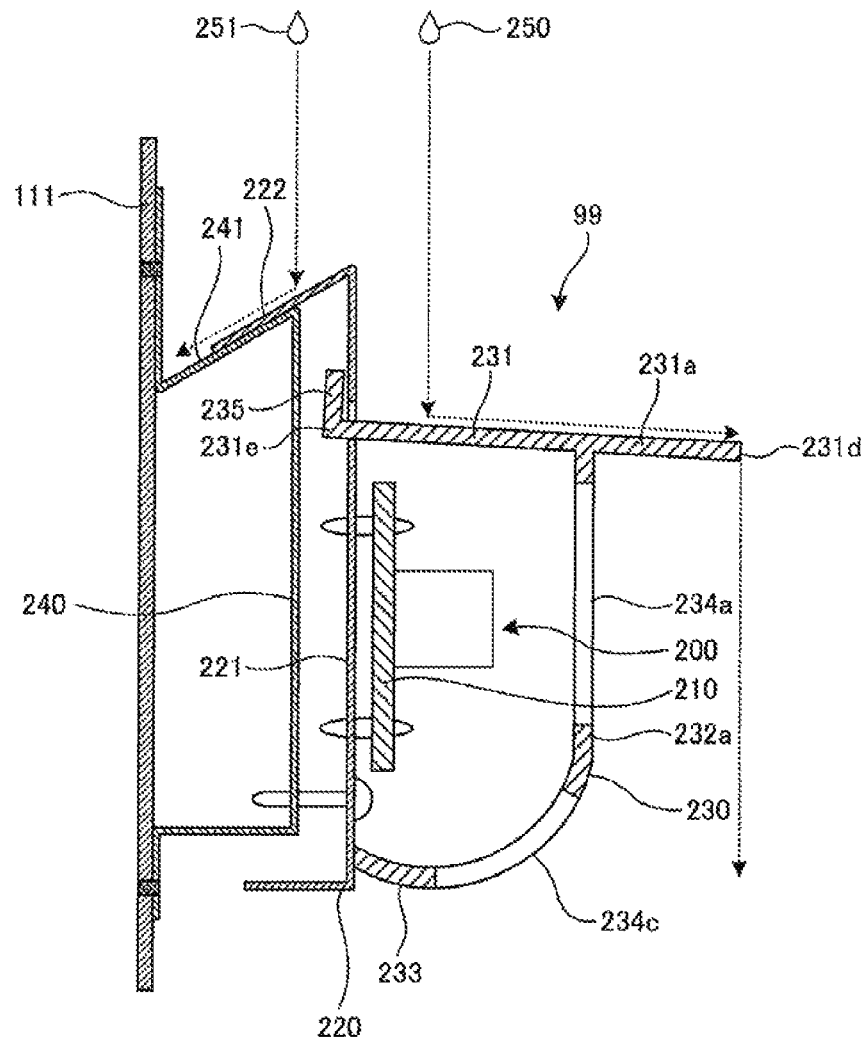
FIG. 9 is an explanatory view for illustrating effects of the refrigerant detection unit 99 in the air-conditioning apparatus according to Embodiment 1 of the present invention.

FIG. 9 is an explanatory view for illustrating effects of the refrigerant detection unit 99 in the air-conditioning apparatus according to Embodiment 1. In FIG. 9, an example of passages of water dropped onto the refrigerant detection unit 99 is indicated by dotted-line arrows. In Embodiment 1, as illustrated in FIG. 9, the roof portion 231 of the sensor cover 230 is provided above the sensor 200. The roof portion 231 has no opening port. Therefore, according to Embodiment 1, even when water drops from above the refrigerant detection unit 99, the sensor 200 arranged below the roof portion 231 can be prevented from being wet.

As illustrated in FIG. 9, for example, water 250 dropping onto the roof portion 231 flows down on the roof portion 231 toward the eaves portion 231a and drops down from the end portion 231d being the distal end portion of the eaves portion 231a. Further, water 251 dropping on the back surface side with respect to the flat plate portion 221 of the mount plate 220 flows down on the upper end portion 222 and the inclined surface 241 to the back surface side and is drained to the near side or the far side on the drawing sheet of FIG. 9.

In Embodiment 1, the roof portion 231 has the eaves portion 231a projecting outward with respect to the front surface portion 232a and the eaves portion 231b projecting outward with respect to the right side surface portion 232b. Water dropping from the distal end portion of the eaves portion 231a and the distal end portion of the eaves portion 231b does not flow down along the front surface portion 232a and the right side surface portion 232b. Thus, water does not enter the opening ports 234a and 234b. Therefore, according to Embodiment 1, even when water drops down from the distal end portion of the eaves portion 231a and the distal end portion of the eaves portion 231b, the sensor 200 can be prevented from being wet.

In Embodiment 1, the weir portion 235 extending upward on the back surface side with respect to the mount plate 220 is formed at the end portion 231e of the roof portion 231. Therefore, according to Embodiment 1, a water droplet falling down along the casing 111 can be prevented from entering the inside of the sensor cover 230.

In Embodiment 1, the insertion hole 236 is formed in the bottom surface portion 233 of the sensor cover 230, while the lead wire 211 drawn out through the insertion hole 236 has the bent portion 211a below the insertion hole 236. Therefore, even when a water droplet flows down along the lead wire 211, the water droplet drops down at the bent portion 211a. Therefore, according to Embodiment 1, the water droplet flowing down along the lead wire 211 does not enter the inside of the sensor cover 230 through the insertion hole 236. Thus, the refrigerant detection unit 99 can be prevented from being wet.

In Embodiment 1, the refrigerant detection unit 99 is mounted along any one of the left side surface, the back surface, and the right side surface included in the inner wall surfaces of the casing 111. Therefore, according to Embodiment 1, even when some water accumulates on the bottom portion of the casing 111, the refrigerant detection unit 99 can be prevented from being wet.

In Embodiment 1, the refrigerant detection unit 99 is provided in the recessed portion within the height range equal to or lower than the height of the opening lower edge 112a of the air inlet 112 in the bottom portion of the lower space 115a inside the casing 111. Therefore, according to Embodiment 1, the leakage of the refrigerant can be more reliably detected by the refrigerant detection unit 99.

In Embodiment 1, the opening ports 234a and the opening ports 234b are formed in the front surface portion 232a and the right side surface portion 232b of the sensor cover 230 on the joint portion 15a side and the joint portion side 15b, respectively. Therefore, the leakage of the refrigerant from the joint portions 15a and 15b can be more reliably detected by the refrigerant detection unit 99.

In Embodiment 1, the total opening area obtained by summing up the opening areas of the opening ports 234a, 234b, and 234c is larger than the opening area of the opening port 203 of the tubular container 202. Therefore, according to Embodiment 1, the detectability for the leaking refrigerant can be prevented from being lowered, while water can be prevented from entering the inside of the sensor cover 230.

In Embodiment 1, the sensor 200 is mounted so that the opening port 203 is oriented in the horizontal direction or downward. Therefore, according to Embodiment 1, the leakage of the refrigerant can be detected in an early stage. Further, a foreign substance or water can be prevented from entering an inside of the sensor 200. Thus, the detectability for the leaking refrigerant can be prevented from being lowered.

In Embodiment 1, the upper end portion 222 of the mount plate 220 is locked onto the inclined surface 241 of the mount base 240 before the refrigerant detection unit 99 is mounted to the mount base 240. As a result, the refrigerant detection unit 99 can be temporarily hooked onto the mount base 240. Therefore, according to Embodiment 1, workability in mounting of the refrigerant detection unit 99 to the casing 111 can be improved.

Embodiment 2

The air-conditioning apparatus according to Embodiment 2 of the present invention is described. The gas sensor used as the sensor 200 of the refrigerant detection unit 99 detects the leakage of the refrigerant, but there is a fear in that the gas sensor erroneously detects different gas (gas other than refrigerant gas) sucked into the indoor unit 1 from outside of the indoor unit 1. The different gas includes propane, an insecticide, and other gases. The air-conditioning apparatus according to Embodiment 2 has a structure capable of preventing such erroneous detection of the different gas.

Figure 10:
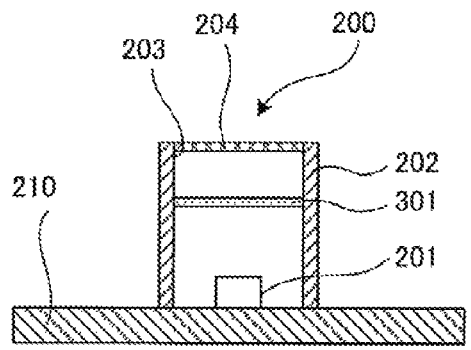
FIG. 10 is a sectional view for illustrating a configuration of the sensor 200 of the air-conditioning apparatus according to Embodiment 2 of the present invention.

FIG. 10 is a sectional view for illustrating a configuration of the sensor 200 in the air-conditioning apparatus according to Embodiment 2. Components having the same functions and actions as those of Embodiment 1 are denoted by the same reference symbols, and the description thereof is herein omitted.

As illustrated in FIG. 10, a fine particle adsorption filter 301 configured to adsorb and remove the different gas is provided between the opening port 203 and the sensor device 201 inside the tubular container 202 of the sensor 200. In Embodiment 2, the fine particle adsorption filter 301 is provided between the mesh portion 204 provided to the opening port 203 and the sensor device 201. A porous material such as silica gel or activated carbon is used for the fine particle adsorption filter 301. With the fine particle adsorption filter 301 provided between the opening port 203 and the sensor device 201, the different gas sucked into the indoor unit 1 is adsorbed by the fine particle adsorption filter 301 before reaching the sensor device 201. As a result, the different gas is less liable to reach the sensor device 201. Thus, a possibility of erroneous detection of the different gas by the sensor 200 can be reduced.

The fine particle adsorption filter 301 adsorbs not only the different gas but also the refrigerant gas. However, even when the fine particle adsorption filter 301 is provided, detection accuracy for the leakage of the refrigerant is not affected thereby. The reason is as follows.

When R32 is used as the refrigerant, a threshold value of the refrigerant concentration for determining the leakage of the refrigerant is, for example, about 3.6 wt % corresponding to ¼ of a lower flammability limit (LFL) (14.4 vol %) of R32 and is of the order of several %. On the other hand, a concentration of the different gas (for example, butane or propane) is generally from about 100 ppm to 1,000 ppm (from 0.01% to 0.1%) and is of a single order or a few orders of magnitude smaller than the threshold value of the refrigerant concentration. Therefore, even when the different gas and the refrigerant gas are adsorbed by the fine particle adsorption filter 301 at such an adsorption rate as to prevent the erroneous detection of the different gas, the detection accuracy for the leakage of the refrigerant is not affected thereby.

In Embodiment 2, the fine particle adsorption filter 301 is provided between the mesh portion 204 and the sensor device 201. However, the mesh portion 204 may be provided between the fine particle adsorption filter 301 and the sensor device 201. Further, in a mounting posture of the sensor 200 illustrated in FIG. 10, the opening port 203 is oriented vertically upward similarly to the mounting posture illustrated in FIG. 7(c). However, the sensor 200 may be mounted in such a mounting posture that the opening port 203 is oriented in the horizontal direction or downward similarly to the mounting posture illustrated in FIG. 7(a) or FIG. 7(b).

Embodiment 3

Figure 11:
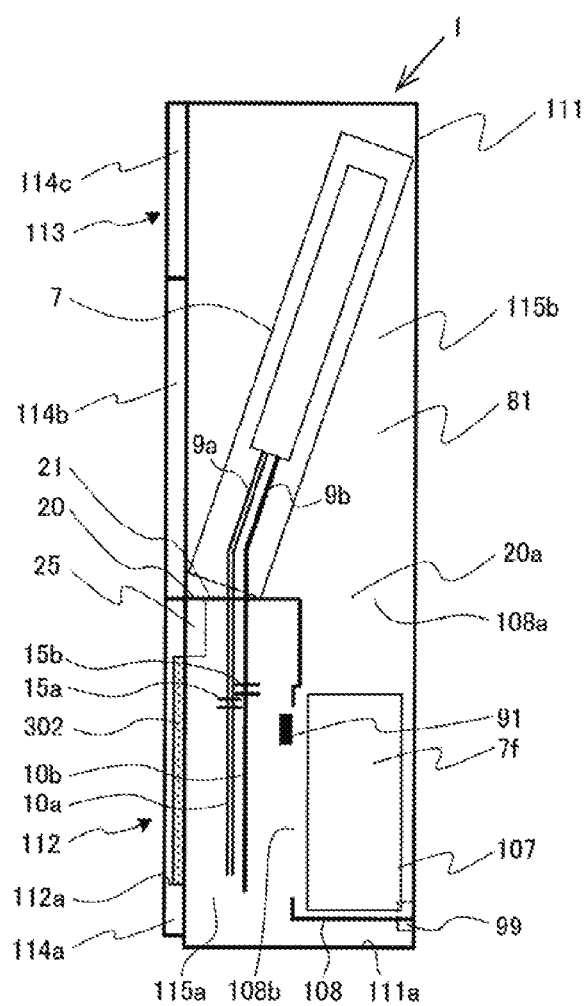
FIG. 11 is a side view for schematically illustrating an internal structure of the indoor unit 1 of the air-conditioning apparatus according to Embodiment 3 of the present invention.

The air-conditioning apparatus according to Embodiment 3 of the present invention is described. The air-conditioning apparatus according to Embodiment 3 has a structure capable of preventing the erroneous detection of the different gas as in Embodiment 2. FIG. 11 is a side view for schematically illustrating an internal structure of the indoor unit 1 included in the air-conditioning apparatus according to Embodiment 3. Components having the same functions and actions as those of Embodiment 1 and Embodiment 2 are denoted by the same reference symbols, and the description thereof is herein omitted.

As illustrated in FIG. 11, a fine particle adsorption filter 302 configured to adsorb and remove the different gas is provided to the air inlet 112 of the indoor unit 1. A porous material such as activated carbon or silica gel is used for the fine particle adsorption filter 302. With the fine particle adsorption filter 302 provided, the different gas outside the indoor unit 1 is less liable to enter the indoor unit 1. As a result, the different gas is less liable to reach the sensor device 201, and hence a possibility of the erroneous detection of the different gas by the sensor 200 can be reduced. Further, for the same reason as that described in Embodiment 2, even when the fine particle adsorption filter 302 is provided, the detection accuracy for the leakage of the refrigerant is not affected thereby.

A dust-collecting filter may be provided to the air inlet 112 independently of the fine particle adsorption filter 302. Specifically, the fine particle adsorption filter 302 may be provided in place of a common dust-collecting filter provided to the air inlet 112 or may be provided in addition to a common dust-collecting filter.

Although the fine particle adsorption filter 302 is provided to the air inlet 112 in Embodiment 3, the fine particle adsorption filter 302 only needs to be provided in an air passage from the air inlet 112 to the sensor 200.

During an operation of the indoor air-sending fan 7f of the indoor unit 1, air is blown out from the air outlet 113 into the indoor space. Therefore, even when the flammable refrigerant leaks indoors, the leaking flammable refrigerant is diffused indoors with the blown air. In this manner, the formation of the flammable concentration region in the indoor space can be suppressed. During a period in which the indoor air-sending fan 7f is stopped, however, air is not blown out into the indoor space. Therefore, the leaking refrigerant cannot be diffused in the indoor space. Therefore, the detection of the leaking refrigerant is especially needed during the period in which the indoor air-sending fan 7f is stopped.

During the period in which the indoor air-sending fan 7f is stopped, there is a possibility that the different gas may enter the indoor unit 1 not only through the air inlet 112 but also through the air outlet 113. Therefore, during the period in which the indoor air-sending fan 7f is stopped, there is a fear in that the different gas which enters the indoor unit 1 through the air outlet 113 may be erroneously detected by the sensor 200. In order to prevent the erroneous detection, a fine particle adsorption filter similar to the fine particle adsorption filter 302 may be provided to the air outlet 113. In this manner, the erroneous detection of the different gas during the period in which the air conditioning apparatus is stopped can be more reliably prevented.

However, during the period in which the indoor air-sending fan 7f is operated, the different gas does not enter the indoor unit 1 through the air inlet 113. Therefore, the fine particle adsorption filter may be mounted to and removed from the air outlet 113 based on the operation of the indoor air-sending fan 7f. For example, a mounting and removal mechanism which is configured to mount the fine particle adsorption filter to the air outlet 113 during the period in which the indoor air-sending fan 7f is stopped and to remove the fine particle adsorption filter from the air outlet 113 during the period in which the indoor-sending fan 7f is operated may be provided to the indoor unit 1.

As described above, the air-conditioning apparatus according to the embodiments described above includes the refrigerant circuit 40 configured to circulate the refrigerant therethrough and the indoor unit 1 configured to accommodate at least the load-side heat exchanger 7 of the refrigerant circuit 40. The indoor unit 1 includes the casing 111, the drain pan 21 provided inside the casing 111 and configured to receive the condensate water generated in the load-side heat exchanger 7, and the refrigerant detection unit 99 provided below the drain pan 21 inside the casing 111. The refrigerant detection unit 99 includes the sensor 200 configured to detect the leakage of the refrigerant and the sensor cover 230 configured to cover the sensor 200 from the front surface side of the sensor 200. The sensor cover 230 includes at least the roof portion 231 arranged above the sensor 200 and the side surface portion 232 (for example, the front surface portion 232a and the right side surface portion 232b) arranged on the front surface side or the side surface side of the sensor 200 below the roof portion 231. The roof portion 231 has the eaves portions 231a and 231b projecting outward with respect to the side surface portion 232. The side surface portion 232 has at least one of the opening ports 234a and 234b configured to introduce air to the inside of the sensor cover 230 therethrough.

According to the configuration described above, the roof portion 231 is provided above the sensor 200. Therefore, even when water drops from above, the sensor 200 can be prevented from being wet. Further, water dropping from the distal end of the eaves portion 231a and the distal end portion of the eaves portion 231b does not flow down along the front surface portion 232a and the right side surface portion 232b, and therefore does not enter the opening ports 234a and 234b. Thus, even when water drops from the distal end of the eaves portion 231a and the distal end of the eaves portion 231b, the sensor 200 can be prevented from being wet. Therefore, a failure of the sensor 200 due to wetting with water can be prevented. Thus, safety of the air-conditioning apparatus can be further enhanced. Further, air can be introduced to the inside of the sensor cover 230 through the opening ports. Thus, the detectability for the leaking refrigerant can be ensured.

Further, in the air-conditioning apparatus according to the embodiments described above, the roof portion 231 may be inclined so that the height becomes lower in a direction toward the eaves portion 231a.

According to the configuration described above, water dropping onto the roof portion 231 can be caused to flow toward the eaves portion 231a so as to drop from the distal end of the eaves portion 231a.

Further, in the air-conditioning apparatus according to the embodiments described above, the refrigerant detection unit 99 further includes the mount plate 220 arranged on the back surface side of the sensor 200. The mount plate 220 may have the slit 225 into which the one end (for example, the end portion 231e) of the roof portion 231 is inserted.

With the configuration described above, a water droplet flowing along a portion of the mount plate 220, which is positioned above the slit 225, can be received by the roof portion 231. Therefore, water can be prevented from entering toward the front surface side of the mount plate 220.

Further, in the air-conditioning apparatus according to the embodiments described above, the weir portion 235 extending upward may be formed at one end of the roof portion 231 on the back surface side with respect to the mount plate 220.

According to the configuration described above, the water droplet falling along the casing 111 can be prevented from entering toward the front surface side of the mount plate 220.

Further, in the air-conditioning apparatus according to the embodiments described above, the locking portion (for example, upper end portion 222) to be locked to the locked portion (for example, inclined surface 241 of mount base 240) provided to the casing 111, which is formed by bending the mount plate 220 to the back surface side at an acute angle, may be formed at the upper portion of the mount plate 220.

According to the configuration described above, the refrigerant detection unit 99 can be temporarily hooked onto the casing 111 (for example, the mount base 240). Thus, the workability in mounting of the refrigerant detection unit 99 to the casing 111 can be improved.

Further, the air-conditioning apparatus according to the embodiments described above may include, the insertion hole 236 into which the lead wire 211 connected to the sensor 200 is inserted is formed in the bottom surface portion 233 of the sensor cover 230, and the lead wire 211 has the bent portion 211a protruding downward below the insertion hole 236.

According to the configuration described above, water can be prevented from entering the inside of the sensor cover 230 along the lead wire 211.

Further, in the air-conditioning apparatus according to the embodiments described above, the casing 111 has the air inlet 112 configured to suck indoor air therethrough and the air outlet 113 provided above the air inlet 112, which is configured to blow out the air sucked through the air inlet 112 to the indoor space therethrough, and the refrigerant detection unit 99 is provided within a height range equal to or lower than the opening lower edge 112a of the air inlet 112.

According to the configuration described above, in the above-mentioned height range inside the casing 111, the recessed portion being open upward with a small volume is formed. Only a part of the leaking refrigerant remains in the recessed portion without flowing out of the casing 111. Therefore, with the refrigerant detection unit 99 provided within the height range within the casing 111, the leakage of the refrigerant can be more reliably detected.

Further, in the air-conditioning apparatus according to the embodiments described above, the sensor 200 includes the sensor device 201, the board 210 configured to receive the sensor device 201 mounted thereon, and the tubular container 202 configured to accommodate the sensor device 201. One axial end side of the tubular container 202 is held in contact with a surface of the board 210. The opening port 203 configured to introduce air to the inside of the tubular container 202 therethrough is formed on an other axial end side of the tubular container 202. The sensor 200 is arranged so that the opening port 203 is oriented in the horizontal direction or oriented downward.

According to the configuration described above, the leakage of the refrigerant can be detected in an early stage, while a foreign substance or water can be prevented from entering the inside of the sensor 200.

Further, in the air-conditioning apparatus according to the embodiments described above, the total opening area of the opening ports 234a, 234b, and 234c formed in the sensor cover 230 may be larger than the opening area of the opening port 203 of the sensor 200.

According to the configuration described above, the detectability for the leaking refrigerant can be prevented from being lowered, while water can be prevented from entering the inside of the sensor cover 230.

Further, in the air-conditioning apparatus according to the embodiments described above, the fine particle adsorption filter 301 may be provided between the opening port 203 (one example of second opening port) and the sensor device 201 inside the tubular container 202.

According to the configuration described above, the erroneous detection of the different gas other than the refrigerant gas can be prevented.

Further, in the air-conditioning apparatus according to the embodiments described above, the casing 111 may have the air inlet 112 configured to suck indoor air therethrough, and the fine particle adsorption filter 302 may be provided to the air inlet 112.

According to the configuration described above, the erroneous detection of the different gas other than the refrigerant gas can be prevented.

Other Embodiments

Various modifications are possible for the present invention without being limited to the embodiments described above.

For example, although the floor-standing type indoor unit has been described as an example of the indoor unit 1 in the embodiments, the present invention is also applicable to indoor units of other types such as a ceiling cassette type, a ceiling concealed type, a ceiling suspended type, and a wall mounted type.

Further, the embodiments described above and modification examples may be carried out in combination.

REFERENCE SIGNS LIST 1 indoor unit 2 outdoor unit 3 compressor 4 refrigerant flow switching device 5 heat source-side heat exchanger 5f outdoor air-sending fan
6 pressure reducing device 7 load-side heat exchanger 7f indoor air-sending fan 9a, 9b indoor pipe 10a, 10b extension pipe 11 suction pipe
12 discharge pipe 13a, 13b extension pipe connection valve 14a, 14b, 14c service port 15a, 15b, 16a, 16b joint portion 20 partition portion 20a air passage opening port 21 drain pan 25 electrical component box 26 operating unit 30 control unit 40 refrigerant circuit 81 air passage 91 sucked air temperature sensor 92 heat exchanger liquid pipe temperature sensor
93 heat exchanger two-phase temperature sensor 99 refrigerant detection unit 107 impeller 108 fan casing 108a outlet opening port
108b inlet opening port 111 casing 111a bottom surface portion 112 air inlet 112a opening lower edge 113 air outlet 114a first front panel
114b second front panel 114c third front panel 115a lower space
115b upper space 200 sensor 201 sensor device 202 tubular container 203 opening port 204 mesh portion 210 board 211 lead wire
211a bent portion 220 mount plate 221 flat plate portion 222 upper end portion 223 lower end portion 224 support member 225 slit 226 lead wire support portion 230 sensor cover 231 roof portion 231a, 231b, 231c eaves portion 231d, 231e end portion 232 side surface portion 232a front surface portion 232b right side surface portion 232c left side surface portion 233 bottom surface portion 234a, 234b, 234c opening port 235 weir portion 236 insertion hole 240 mount base 241 inclined surface 242 welding portion 243 screw 250, 251 water 301, 302 fine particle adsorption filter

The invention claimed is:

1. An air-conditioning apparatus, comprising:
a refrigerant circuit configured to circulate refrigerant therethrough; and
an indoor unit configured to accommodate at least a load-side heat exchanger of the refrigerant circuit, the indoor unit including:
a casing;
a drain pan, which is provided inside the casing, and is configured to receive condensate water generated in the load-side heat exchanger; and
a refrigerant detection unit provided below the drain pan inside the casing, the refrigerant detection unit including:
a sensor configured to detect leakage of the refrigerant;
a sensor cover configured to cover the sensor from a front surface side of the sensor; and
a mount plate arranged on a back surface side of the sensor, the sensor cover including:
a roof portion arranged above the sensor; and
a side surface portion arranged on the front surface side or a side surface side of the sensor below the roof portion,
the roof portion having an eaves portion projecting outward with respect to the side surface portion,
the side surface portion having at least one first opening port configured to introduce air to an inside of the sensor cover therethrough, and
the mount plate having a slit into which one end of the roof portion is inserted.

2. The air-conditioning apparatus of claim 1, wherein a weir portion extending upward is formed at one end of the roof portion on a back surface side with respect to the mount plate.

3. The air-conditioning apparatus of claim 1, wherein a locking portion to be locked to a locked portion provided to the casing, which is formed by bending the mount plate to a back surface side at an acute angle, is formed at an upper portion of the mount plate.

4. The air-conditioning apparatus of claim 1, wherein the roof portion is inclined so that a height becomes lower toward the eaves portion.

5. The air-conditioning apparatus of claim 1,
wherein the casing has an air inlet configured to suck indoor air therethrough, and
wherein a fine particle adsorption filter is provided to the air inlet.

6. The air-conditioning apparatus of claim 1,
wherein the casing has an air inlet configured to suck indoor air therethrough and an air outlet provided above the air inlet, which is configured to blow out the air sucked through the air inlet to an indoor space therethrough, and
wherein the refrigerant detection unit is provided within a height range equal to or lower than an opening lower edge of the air inlet.

7. An air-conditioning apparatus, comprising:
a refrigerant circuit configured to circulate refrigerant therethrough; and
an indoor unit configured to accommodate at least a load-side heat exchanger of the refrigerant circuit therein, the indoor unit including:
a casing:
a drain pan, which is provided inside the casing, and is configured to receive condensate water generated in the load-side heat exchanger; and
a refrigerant detection unit provided below the drain pan inside the casing, the refrigerant detection unit including:
a sensor configured to detect leakage of the refrigerant; and
a sensor cover configured to cover the sensor from a front surface side of the sensor, the sensor cover including:
a roof portion arranged above the sensor; and
a side surface portion arranged on the front surface side or a side surface side of the sensor below the roof portion,
the roof portion having an eaves portion projecting outward with respect to the side surface portion,
the side surface portion having at least one first opening port configured to introduce air to an inside of the sensor cover therethrough,
an insertion hole into which a lead wire connected to the sensor being inserted is formed in a bottom surface portion of the sensor cover,
the lead wire having a bent portion protruding downward below the insertion hole.

8. An air-conditioning apparatus, comprising:
a refrigerant circuit configured to circulate refrigerant therethrough; and
an indoor unit configured to accommodate at least a load-side heat exchanger of the refrigerant circuit therein, the indoor unit including:
a casing:
a drain pan, which is provided inside the casing, and is configured to receive condensate water generated in the load-side heat exchanger; and
a refrigerant detection unit provided below the drain pan inside the casing, the refrigerant detection unit including:
a sensor configured to detect leakage of the refrigerant; and
a sensor cover configured to cover the sensor from a front surface side of the sensor, the sensor cover including:
a roof portion arranged above the sensor; and
a side surface portion arranged on the front surface side or a side surface side of the sensor below the roof portion,
the roof portion having an eaves portion projecting outward with respect to the side surface portion,
the side surface portion having at least one first opening port configured to introduce air to an inside of the sensor cover therethrough,
the sensor including:
a sensor device;
a board configured to receive the sensor device mounted thereon; and
a tubular container configured to accommodate the sensor device therein,
one axial end side of the tubular container being held in contact with a surface of the board,
a second opening port configured to introduce air to an inside of the tubular container therethrough being formed on an other axial end side of the tubular container,
the sensor being arranged so that the second opening port is oriented in a horizontal direction or oriented downward.

9. The air-conditioning apparatus of claim 8, wherein a fine particle adsorption filter is provided between the second opening port and the sensor device inside the tubular container.

10. The air-conditioning apparatus of claim 8, wherein an opening area of the at least one first opening port is larger than an opening area of the second opening port.

* * * * *